US012059723B2

(12) United States Patent
Chuang

(10) Patent No.: US 12,059,723 B2
(45) Date of Patent: Aug. 13, 2024

(54) CHAIN TOOL FOR DIFFERENT SPEED CHAINS

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 407 days.

(21) Appl. No.: 17/408,717

(22) Filed: Aug. 23, 2021

(65) Prior Publication Data

US 2022/0152691 A1 May 19, 2022

(30) Foreign Application Priority Data

Nov. 18, 2020 (TW) ................................ 109140357

(51) Int. Cl.

| | |
|---|---|
| ***B21L 9/06*** | (2006.01) |
| ***B21L 9/04*** | (2006.01) |
| ***B21L 21/00*** | (2006.01) |
| ***B25B 27/02*** | (2006.01) |
| ***B25B 27/22*** | (2006.01) |

(52) U.S. Cl.

CPC ................. *B21L 9/065* (2013.01); *B21L 9/04* (2013.01); *B21L 21/00* (2013.01); *B25B 27/023* (2013.01); *B25B 27/22* (2013.01)

(58) Field of Classification Search

CPC ... B25B 27/22; B25B 27/0071; B25B 27/023; B25B 5/082; B21L 21/00; B21L 9/04; B21L 9/065

See application file for complete search history.

(56) References Cited

U.S. PATENT DOCUMENTS

| | | | | |
|---|---|---|---|---|
| 2,826,893 | A | 3/1958 | Falk et al. | |
| 3,379,005 | A * | 4/1968 | Jones | F16G 3/006 59/7 |
| 5,644,092 | A | 7/1997 | Oomori et al. | |
| 11,298,741 | B2 * | 4/2022 | Huang | B21L 9/065 |
| 2004/0250528 | A1 | 12/2004 | Coleman | |
| 2011/0016843 | A1 | 1/2011 | Scott | |
| 2013/0067708 | A1 * | 3/2013 | Kuo | B25B 27/22 29/258 |

FOREIGN PATENT DOCUMENTS

| | | | |
|---|---|---|---|
| CN | 1709649 | A | 12/2005 |
| CN | 106217309 | A | 12/2016 |
| CN | 211491345 | U | 9/2020 |
| DE | 202013101539 | U1 | 4/2013 |
| TW | 201228879 | A | 7/2012 |

(Continued)

*Primary Examiner* — Abbie E Quann

(74) *Attorney, Agent, or Firm* — Muncy, Geissler, Olds & Lowe, P.C.

(57) ABSTRACT

A chain tool with a main body having a first body portion and a second body portion. A driving mechanism is supported by the first body portion and movable toward and away from the second body portion. The driving mechanism includes a first driving member adapted to retain one of a pair of plates of a chain and a second driving member adapted to drive a pin through the pair of plates. A stopper adapted to stop the pin selectively connected with the second body portion between a first and a second connection way. The second body portion has a slot for connecting the stopper. In the first connection way, the stopper includes a first end inserted in the slot. In the second connection way the stopper includes a second end inserted in the slot.

8 Claims, 7 Drawing Sheets

(56) References Cited

FOREIGN PATENT DOCUMENTS

| | | | |
|---|---|---|---|
| TW | 201236827 | A | 9/2012 |
| TW | 201325766 | A | 7/2013 |
| TW | I461265 | B | 11/2014 |
| TW | 201607640 | A | 3/2016 |
| TW | I538752 | B | 6/2016 |
| TW | 201639673 | A | 11/2016 |
| TW | I556886 | B | 11/2016 |
| TW | I583510 | B | 5/2017 |
| TW | 202010609 | A | 3/2020 |

* cited by examiner

CHAIN TOOL FOR DIFFERENT SPEED CHAINS

BACKGROUND OF THE INVENTION

1. Field of the Invention

The present invention relates to a chain tool and, particularly, to a chain tool for chains of different speeds.

2. Description of the Related Art

Taiwan Pat. No. 1461265 discloses a chain tool including a shell, a main body, a retaining member, a driving member, and a cover. The main body, the retaining member, and the driving member can be stowed in the shell. When the chain tool in a stowed position, the body, the retaining member, and the driving member are not exposed.

Generally, chains of different speeds have different widths. The chain tool set forth is only usable for one chain width a predetermined size. It can not hold chains that have widths greater than the predetermined width. Neither can it hold chains that have widths smaller than the predetermined width securely.

The present invention is, therefore, intended to obviate or at least alleviate the problems encountered in the prior art.

SUMMARY OF THE INVENTION

According to the present invention, a chain tool for chains of different speeds includes a main body which has a first body portion and a second body portion and includes a working zone delimited by the first and the second body portions for receiving a chain. A driving mechanism is supported by the first body portion and movable toward and away from the second body portion. The driving mechanism includes a first driving member adapted to retain one of a pair of plates of the chain and a second driving member adapted to drive a pin through the pair of plates of the chain. The second driving member is movably coupled to the first driving member. A stopper adapted to stop the pin selectively connected with the second body portion between a first and a second connection way. The second body portion has a slot for connecting the stopper. In the first connection way, the stopper includes a first end inserted in the slot. In the second connection way, the stopper includes a second end inserted in the slot.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the abstract is to enable the public generally, and especially scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
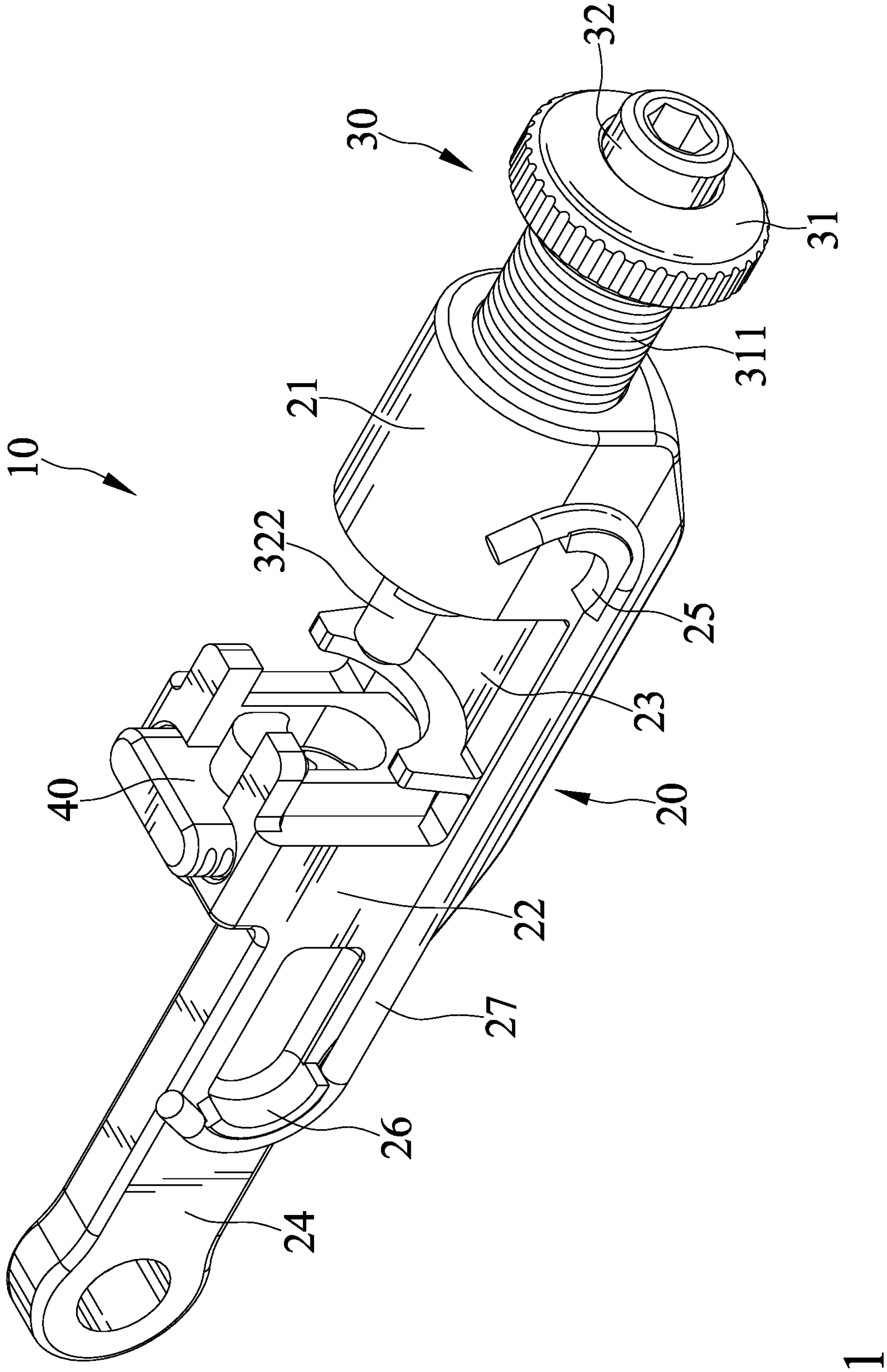
FIG. 1 is a perspective view of a chain tool for chains of different speeds in accordance with the present invention in a first configuration.
Figure 2:
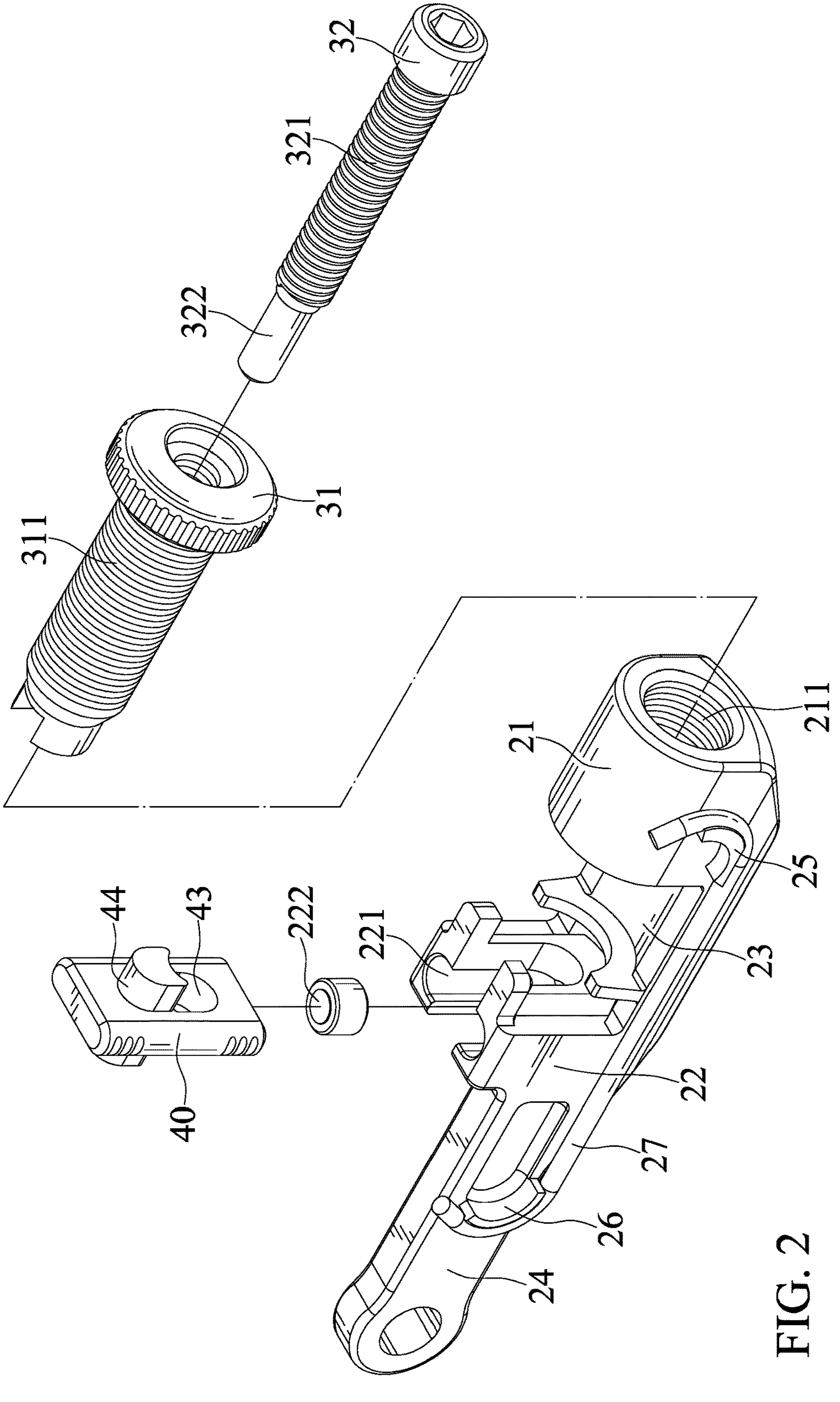
FIG. 2 is an exploded perspective view of the chain tool.
Figure 3:
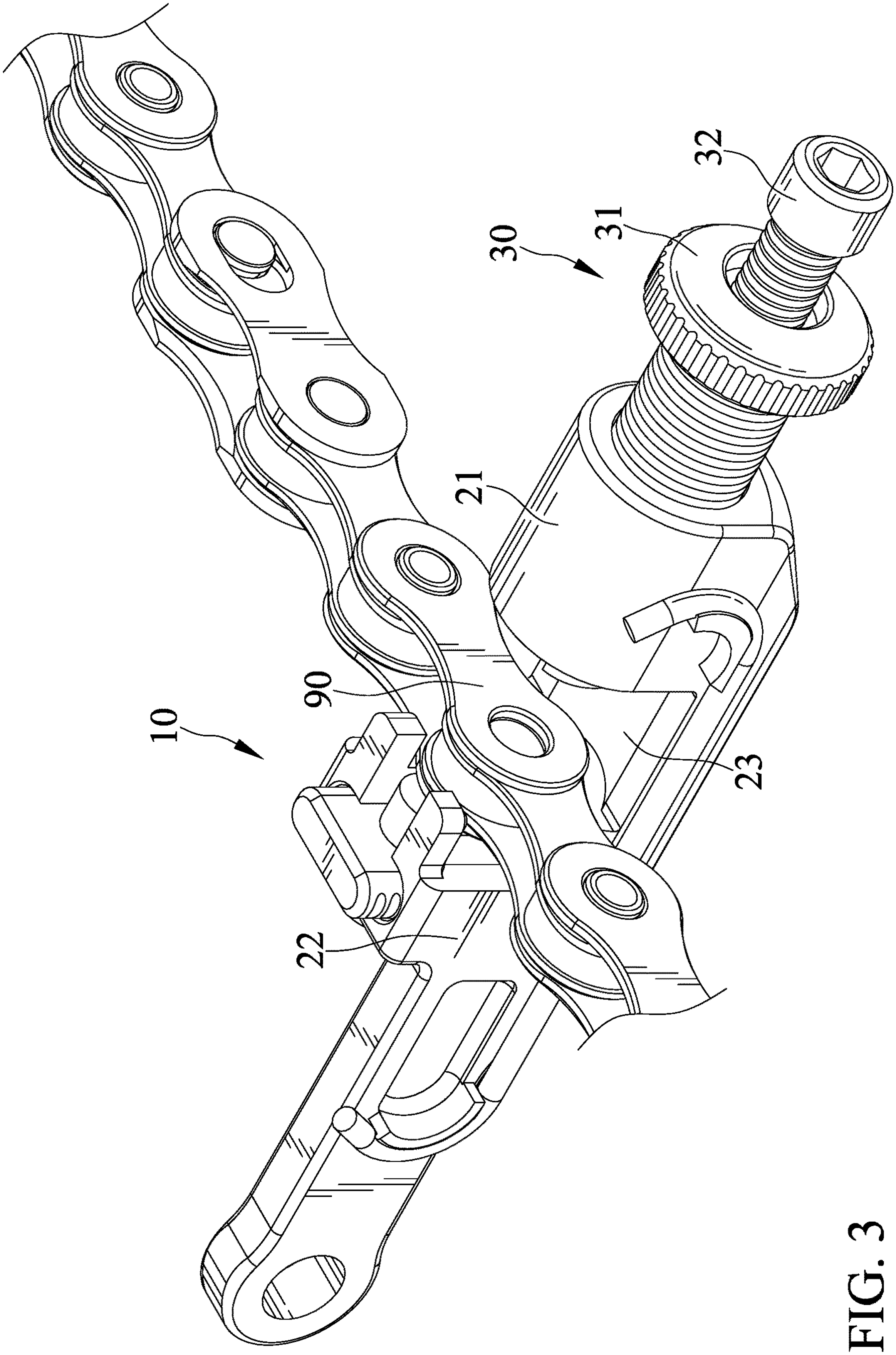
FIG. 3 is a perspective view illustrating the use of the chain tool on a chain.
Figure 4:
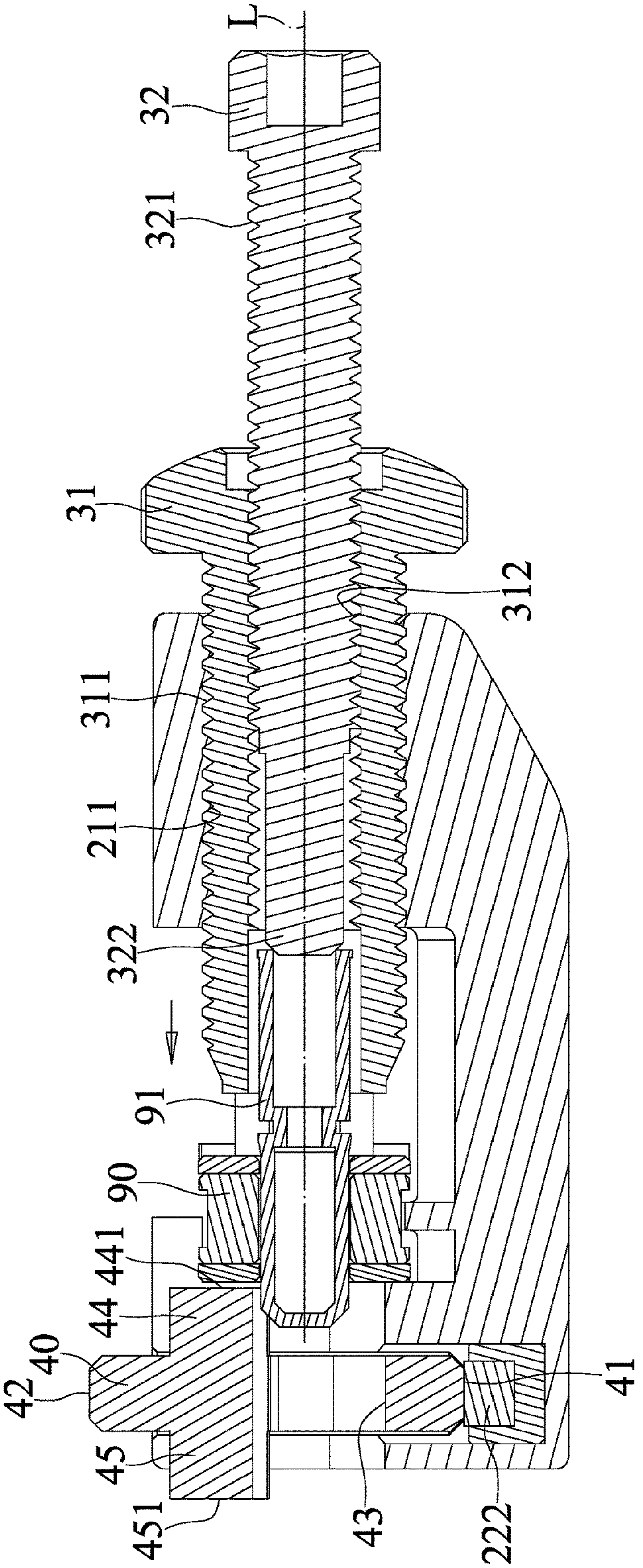
FIG. 4 is a cross-sectional view illustrating a movable first driving member of the chain tool retaining the chain.
Figure 5:
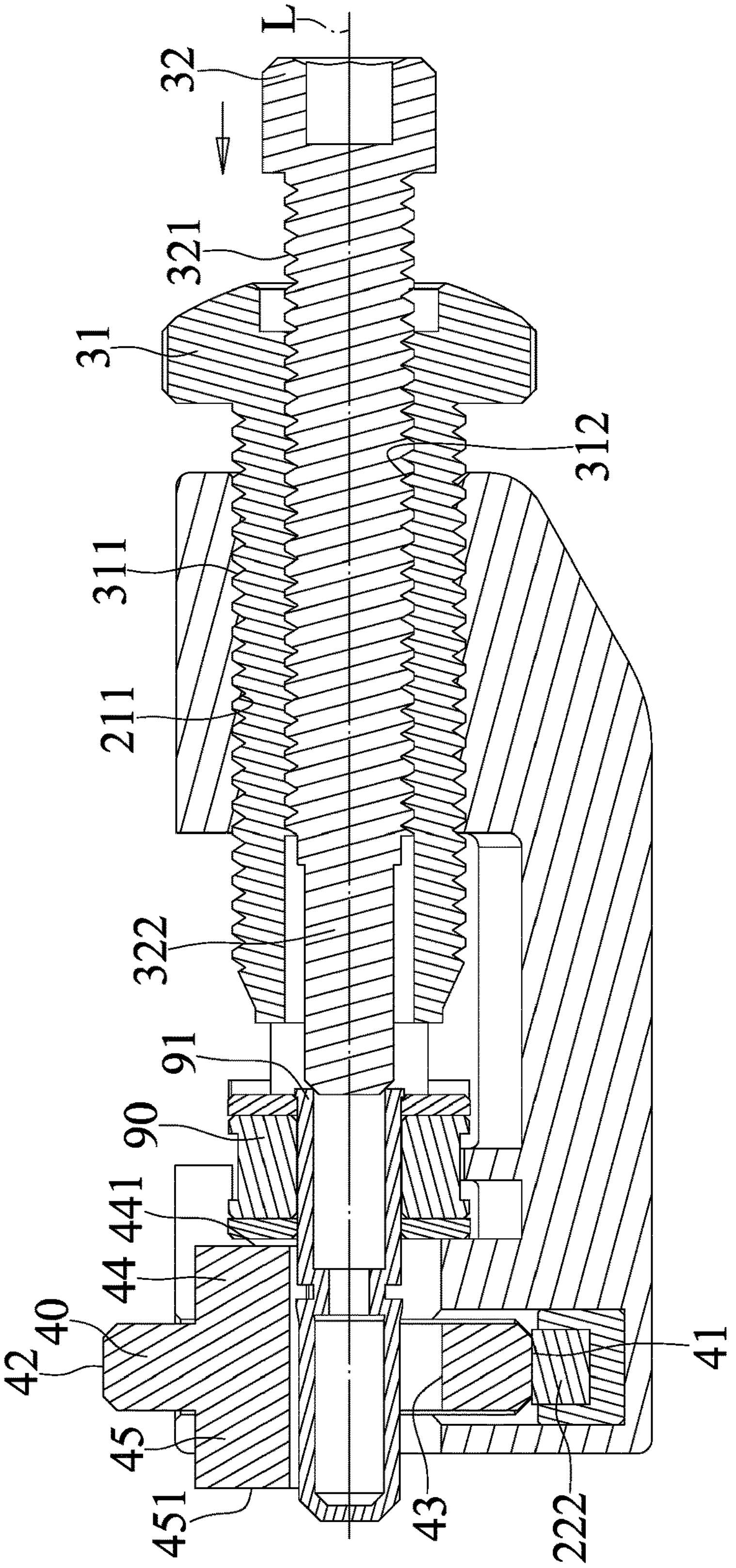
FIG. 5 is cross-sectional view illustrating a pin pushed through the chain by a movable second driving member of the chain.
Figure 6:
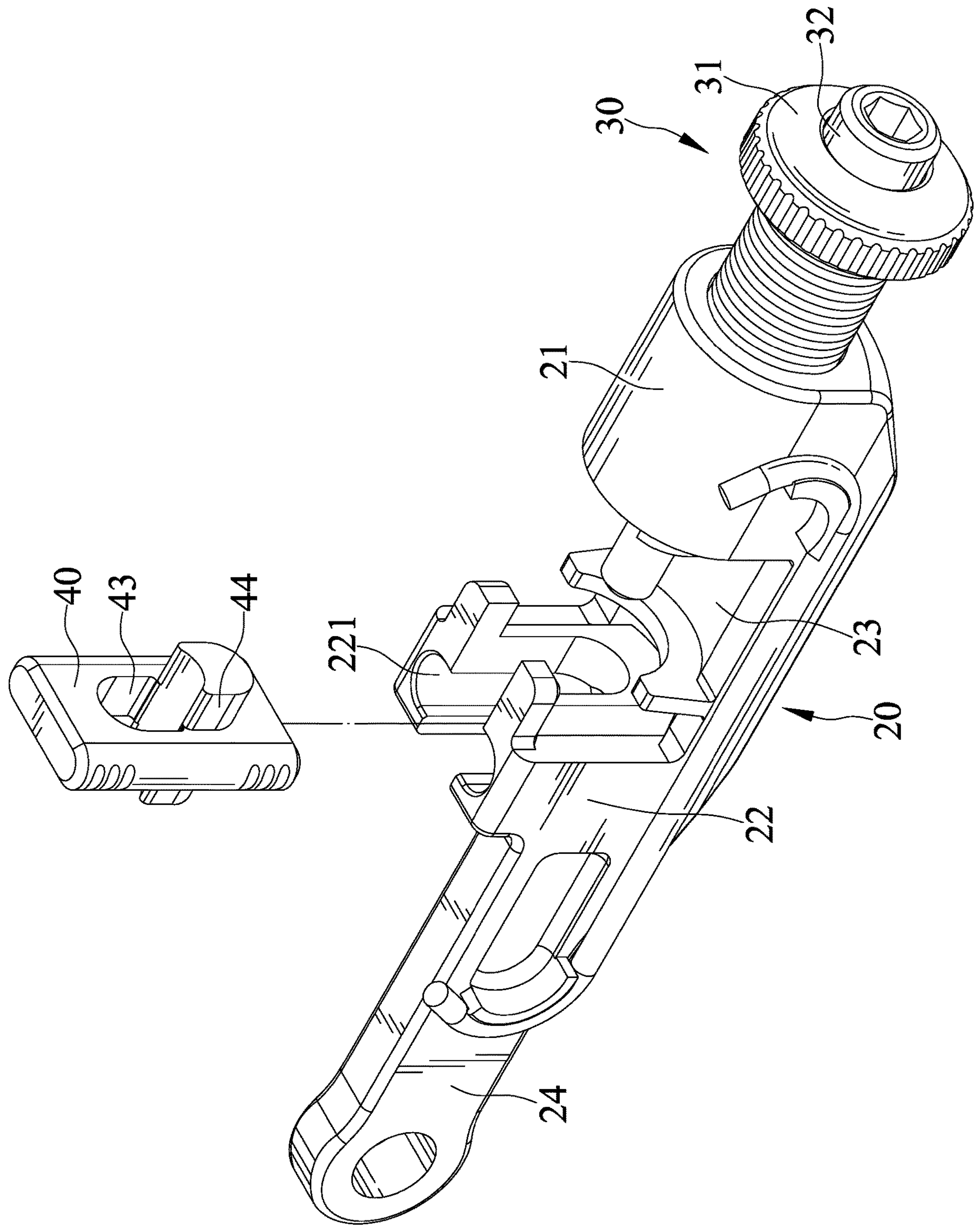
FIG. 6 is an exploded perspective view of the chain tool in a second configuration.
Figure 7:
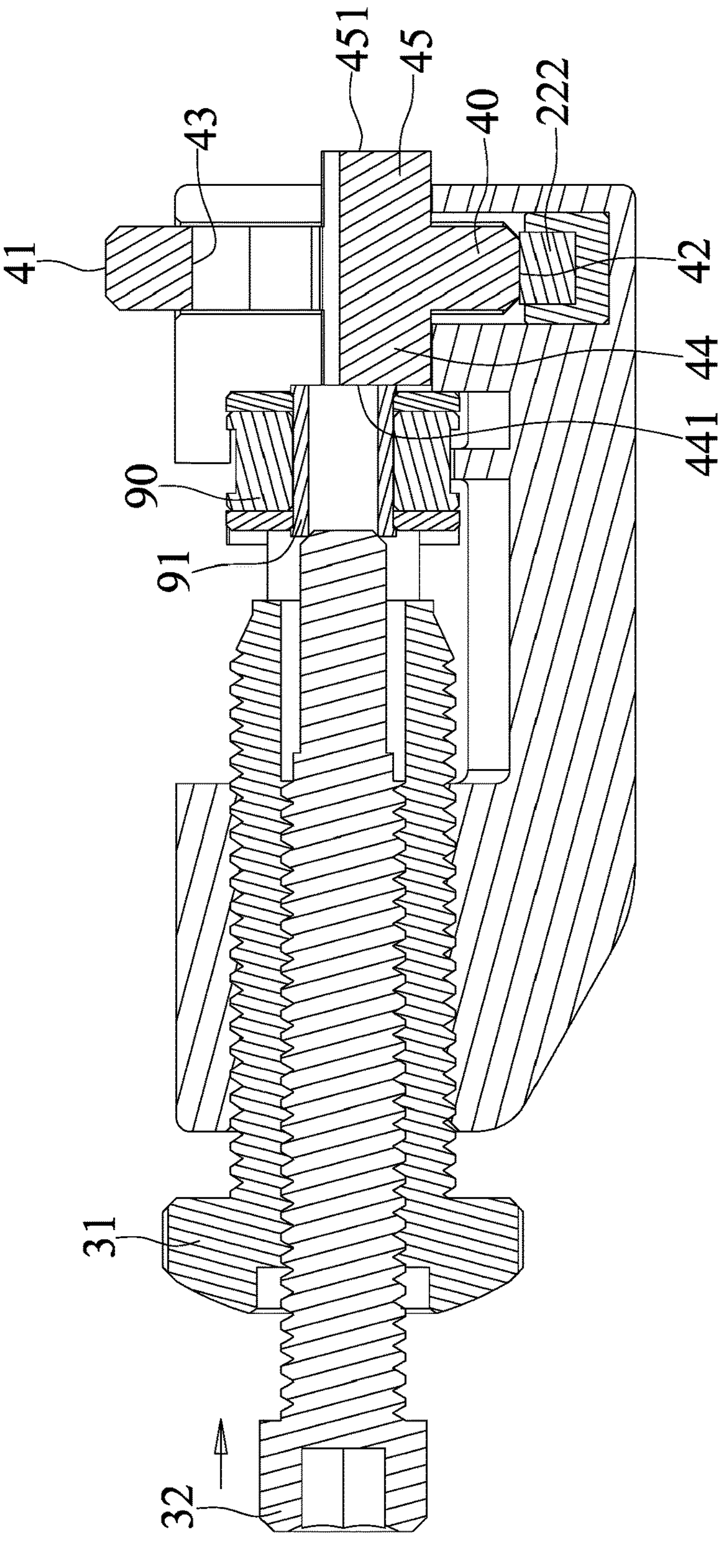
FIG. 7 is a cross-sectional view illustrating the pin riveted to the chain by the second driving member.

FIGS. 1 through 7 show a chain tool 10 for chains of different speeds in accordance with the present invention. The chain tool 10 has a main body 20 having a body portion 21 and a body portion 22 and including a working zone 23 delimited by the body portions 21 and 22 for receiving a chain 90. The main body 20 has a handle portion 24 adapted to be grasped by hand. The main body 20 includes at least one catch 25 for retaining a chain hook 27. The at least one catch includes a catch 25 and a catch 26 separated from each other. The catches 25 and 26 are adapted to retain a first and a second end of the chain hook 27, respectively. Each of the first and the second ends of the chain hook 27 is curved and in a form of a hook.

A driving mechanism 30 is supported by the body portion 21 and movable toward and away from the body portion 22. The driving mechanism 30 and the handle portion 24 are on opposite sides of the second body portion 22. The driving member 31 and the body portion 21 are in thread engagement. The driving member 31 has external threads 311 and the body portion 21 has a hole with internal threads 211, respectively. The external threads 311 is engaged with the internal threads 211. The driving member 31 is inserted through the hole with internal threads 211 and extends longitudinally along an axis L.

The driving mechanism 30 includes a driving member 31 adapted to retain one of a pair of plates of the chain 90 and a driving member 32 adapted to drive a pin 91 through the pair of plates of the chain 90. In the embodiment, the driving member 32 is adapted to drive a hollow pin 91.

The driving member 32 is movably coupled to the driving member 31. Each of the driving members 31 and 32 has an end movable in a position adjacent to the body portion 22 and another position away from the body portion 22. The driving members 31 and 32 are in thread engagement. The driving member 31 has a hole with internal threads 312 and the driving member 32 has external threads 321, respectively. The external threads 321 is engaged with the internal threads 312. The driving member 32 is inserted through the hole with internal threads 312 and extends longitudinally along an axis L. The driving member 31 is hollow and the driving member 32 is inserted into the driving member 31. The driving member 32 includes a drive head 322 at an end for contacting with the pin 91. The drive head 322 is adjacent to the body portion 22. The drive head 322 is cylindrical about the axis L. The drive head 322 has a diameter smaller than the major diameter of the external threads 321. Thus, the drive head 322 is free of contact with the driving member 31.

A stopper 40 is adapted to stop the pin 91 selectively connected with the body portion 22 between a first and a second connection way. The body portion 22 has a slot 221 for connecting the stopper 40. In the first connection way, the stopper 40 includes an first end 41 inserted in the slot 221. In the second connection way, the stopper 40 includes an second end 42 inserted in the slot 221. The slot 221 includes a magnetic member 222 disposed therein. In the first connection way, the first end 41 is magnetically contacted with the magnetic member 222. In the second connection way, the second end 42 is magnetically contacted with the magnetic member 222.

The stopper 40 has a hole 43 through which the pin 91 is adapted to insert and a stopping portion 44 with a stopping surface 441 against which an end of the pin 91, which is opposite to an end against which the driving member 32 abuts to drive, is adapted to abut. Moreover, the stopper 40 has a stopping portion 45 with a stopping surface 451 against which an end of the pin 91, which is opposite to an end against which the second driving member 32 abuts to drive, is adapted to abut. The stopping portions 44 and 45 are on opposite sides of the stopper 40. The stopper 40 is further connectible with the body portion 22 in a third connection way. In the third connection way, the second end 42 of the stopper 40 is inserted in the slot 221 and the stopping surface 451 is adapted to block the pin 91. The hole 43 is adjacent to the stopping surfaces 441 and 451. The hole 43 extends through two opposite sides of the stopper 40. The stopping portion 44 protrudes outwardly from one of the two opposite sides and the stopping portion 45 protrudes outwardly from the other of the two opposite sides.

Further, in the first connection way, the stopping portion 44 is at a position that will not interfere with the pin 91. In the second connection way, the stopping portion 44 is at another position in which the stopping surface 441 is adapted to block the pin 91. When the hollow pin 91 is pushed by the driving member 32, i.e. the drive head 322 of the driving member 32, the hole 43 allows insertion of the pin 91 and is aligned with the drive head 32.

In view of the foregoing, the first driving member 31 is adjustable to different retaining positions according to different chains of different speeds, which have different widths. The driving member 32 and the stopper 40 disposed in the second connection way cooperatively tight fit the pin 91 between the pair of plates of the chain 90.

The foregoing is merely illustrative of the principles of this invention, and various modifications can be made by those skilled in the art without departing from the scope and spirit of the invention.

What is claimed is:

1. A chain tool for chains of different speeds comprising:

a main body having a first body portion and a second body portion and including a working zone delimited by the first and the second body portions for receiving a chain;

a driving mechanism supported by the first body portion and movable toward and away from the second body portion, wherein the driving mechanism includes a first driving member adapted to retain one of a pair of plates of the chain and a second driving member adapted to drive a pin through the pair of plates of the chain, and wherein the second driving member is movably coupled to the first driving member; and a stopper adapted to stop the pin selectively connected with the second body portion between a first and a second connection way, wherein the second body portion has a slot for connecting the stopper, wherein in the first connection way the stopper includes a first end inserted in the slot, and wherein in the second connection way the stopper includes a second end inserted in the slot;

wherein the first driving member is hollow and the second driving member is inserted into the first driving member, wherein the second driving member includes a drive head at an end for contacting with the pin, wherein the stopper has a hole through which the pin is adapted to insert and a first stopping portion with a first stopping surface against which an end of the pin, which is opposite to an end against which the second driving member abuts to drive, is adapted to abut, wherein in the first connection way the first stopping portion is at a position that will not interfere with the pin, and wherein in the second connection way the first stopping portion is at another position in which the first stopping surface is adapted to block the pin; and wherein the hole extends through two opposite sides of the stopper, and wherein the first stopping portion protrudes outwardly from one of the two opposite sides.

2. The chain tool as claimed in claim 1, wherein the stopper has a second stopping portion with a second stopping surface against which the end of the pin, which is opposite to the end against which the second driving member abuts to drive, is adapted to abut, wherein the first stopping portion and the second stopping portion are on opposite sides of the stopper, wherein the stopper is further connectible with the second body portion in a third connection way, and wherein in the third connection way the second end of the stopper is inserted in the slot and the second stopping surface is adapted to block the pin.

3. The chain tool as claimed in claim 2, wherein the hole extends through two opposite sides of the stopper, and wherein the first stopping portion protrudes outwardly from one of the two opposite sides and the second stopping portion protrudes outwardly from the other of the two opposite sides.

4. The chain tool as claimed in claim 1, wherein the slot includes a magnetic member disposed therein, wherein in the first connection way the first end of the stopper is magnetically contacted with the magnetic member, and wherein in the second connection way the second end of the stopper is magnetically contacted with the magnetic member.

5. The chain tool as claimed in claim 2, wherein the slot includes a magnetic member disposed therein, wherein in the first connection way the first end of the stopper is magnetically contacted with the magnetic member, and wherein in the second and the third connection ways the second end of the stopper is magnetically contacted with the magnetic member.

6. The chain tool as claimed in claim 1, wherein the main body has a handle portion adapted to be grasped by hand, and wherein the handle portion and the driving mechanism are on opposite sides of the second body portion.

7. The chain tool as claimed in claim 1, wherein the main body includes at least one catch a plurality of catches for retaining a chain hook, wherein the catches comprises a first catch and a second catch separated from each other, and wherein the first catch and the second catch are adapted to retain a first end and a second end of the chain hook, respectively.

8. The chain tool as claimed in claim 1, wherein the first driving member and the second driving member are in thread engagement.

* * * * *